United States Patent
Selbrede et al.

(10) Patent No.: US 8,548,289 B2
(45) Date of Patent: Oct. 1, 2013

(54) APPARATUS AND METHOD FOR REDUCING PIXEL OPERATIONAL VOLTAGE IN MEMS-BASED OPTICAL DISPLAYS

(75) Inventors: Martin G. Selbrede, The Woodlands, TX (US); Daniel K. Van Ostrand, The Woodlands, TX (US)

(73) Assignee: Rambus Delaware LLC, Brecksville, OH (US)

( * ) Notice: Subject to any disclaimer, the term of this patent is extended or adjusted under 35 U.S.C. 154(b) by 566 days.

(21) Appl. No.: 12/808,122

(22) PCT Filed: Dec. 12, 2008

(86) PCT No.: PCT/US2008/086712
§ 371 (c)(1),
(2), (4) Date: Sep. 13, 2010

(87) PCT Pub. No.: WO2009/079414
PCT Pub. Date: Jun. 25, 2009

(65) Prior Publication Data
US 2011/0007377 A1    Jan. 13, 2011

Related U.S. Application Data

(60) Provisional application No. 61/013,738, filed on Dec. 14, 2007, provisional application No. 61/040,554, filed on Mar. 28, 2008.

(51) Int. Cl.
*G02B 6/26* (2006.01)
*G02B 26/00* (2006.01)

(52) U.S. Cl.
USPC .................. 385/31; 385/15; 385/40; 385/901; 359/291; 359/295

(58) Field of Classification Search
None
See application file for complete search history.

(56) References Cited

U.S. PATENT DOCUMENTS 6,281,868 B1 * 8/2001 Takeuchi et al. ............... 345/90
6,381,381 B1   4/2002 Takeda et al.
(Continued)

FOREIGN PATENT DOCUMENTS

| EP | 0916965 | 5/1999 |
|---|---|---|
| JP | 2001-324960 | 11/2001 |
| KR | 10-2004-0018469 | 3/2004 |
| KR | 10-2006-0116102 | 11/2006 |

OTHER PUBLICATIONS

International Search Report and Written Opinion issued for PCT/US/2008/086712 dated Apr. 30, 2009, 6 pgs.
Extended European Search Report issued Mar. 10, 2011 in EP Application No. 08862099.2 (7 pages) (enclosed).

(Continued)

*Primary Examiner* — Michelle R Connelly
(74) *Attorney, Agent, or Firm* — Renner, Otto, Boisselle & Sklar, LLP

(57) ABSTRACT

Embodiments of a display comprising pixels formed from suitably tethered deformable membrane-based MEMS subsystems are provided that include the means to dynamically alter the in-plane tension, and thus the effective spring constant, of the deformable membrane being ponderomotively propelled between active and inactive optical states, said dynamic alteration being effected by exploiting transverse piezoelectric properties of the deformable membranes. Manipulating the spring constant can reduce the actuation force required to turn pixels on, thus significantly reducing the operational voltages for the display composed of an array of such subsystems. Since display power rises with the square of the pixel drive voltage, such architectures give rise to more power efficient display systems.

14 Claims, 10 Drawing Sheets

(56) References Cited

U.S. PATENT DOCUMENTS

| | | | |
|---|---|---|---|
| 6,642,913 B1 * | 11/2003 | Kimura et al. | 345/84 |
| 7,126,254 B2 * | 10/2006 | Nanataki et al. | 310/324 |
| 7,751,663 B2 * | 7/2010 | Van Ostrand | 385/39 |
| 2003/0165288 A1 | 9/2003 | Deliwala | |
| 2007/0172171 A1 | 7/2007 | Van Ostrand et al. | |
| 2008/0075414 A1 | 3/2008 | Van Ostrand et al. | |

OTHER PUBLICATIONS

JP Office Action dated Jun. 21, 2012 in JP Application No. 2010-538214. 4 pages.

CN Second Office Action dated Jul. 23, 2012 re CN Application No. 200880121031.5. 9 pages.

KR Second Office Action mailed Aug. 29, 2012 re Preliminary Rejection in KR Application No. 10-2010-7015494 (6 pages).

\* cited by examiner

APPARATUS AND METHOD FOR REDUCING PIXEL OPERATIONAL VOLTAGE IN MEMS-BASED OPTICAL DISPLAYS

CROSS REFERENCE TO RELATED APPLICATION

This application claims priority to U.S. Provisional Patent Application No. 61/013,738, entitled "Methods of Reducing Pixel Operational Voltage in MEMS-based Optical Displays", filed on Dec. 14, 2007, which is herein incorporated by reference, and this application claims priority to U.S. Provisional Patent Application No. 61/040,554, entitled "Apparatus and Method for Reducing Pixel Operational Voltage in MEMS-based Optical Displays", filed on Mar. 28, 2008, which is herein incorporated by reference.

FIELD OF THE INVENTION

The present invention relates to the field of displays and, more specifically to display systems that incorporate micro-electro-mechanical systems (MEMS) to selectively control the extraction of light from a waveguide.

BACKGROUND

This section is intended to introduce the reader to various aspects of art that may be related to aspects of the present invention, which are described and/or claimed below. This discussion is believed to be helpful in providing the reader with background information to facilitate a better understanding of the present invention. Accordingly, it should be understood that these statements are to be read in this light, and not as admissions of prior art.

Flat panel displays are incorporated into an increasing number of products, including computer monitors, televisions, cellular phones, personal digital assistants (PDA's), instrumentation, monitoring devices, and the like. Flat panel displays often include liquid crystal displays (LCDs), organic light emitting diode (OLED) displays, and liquid plasma displays. These and other display systems often incorporate micro-electro-mechanical systems (MEMS) within the display to provide a variety of functions including shuttering light to generate images.

Some display systems include a slab waveguide (e.g., a light guide) configured to distribute light to various regions of the display. Light is injected into the waveguide and is reflected within the waveguide in accordance with the principle of total internal reflection (TIR). Totally internal reflected light within the waveguide, referred to as "TIR light," is emitted from the waveguide when the internal reflection is frustrated in accordance with the principle of frustrated total internal reflection (FTIR). For instance, total internal reflection occurring at a given region of the waveguide, such as the location of an individual pixel, can be frustrated to eject light from the waveguide at that region. One example of such a FTIR display is a Time Multiplexed Optical Shutter (TMOS) flat panel color display system, wherein MEMS structures are used to selectively control the frustration of TIR light at localized regions (i.e., pixel regions). In one MEMS-based structure, TIR light is frustrated by propelling an optically-suitable material, for example a deformable membrane layer, into contact or near-contact with a surface of the waveguide to couple light out of the waveguide and, thus, create an active region where light is ejected. Accordingly, the active region may include the deformable membrane layer disposed in contact or in near-contact with the display surface of the waveguide, such that TIR light is frustrated and directed out of the waveguide at the active region (i.e., an "ON" pixel). An inactive region generally includes the deformable membrane layer sufficiently displaced from the waveguide by a gap such that evanescent coupling across the gap is negligible, and light is not directed out of the waveguide, but is instead internally reflected into the waveguide at the inactive region (i.e., an "OFF" pixel) due to TIR arising at that surface according to the laws of optics. In a display system, a rectangular array of such MEMS-based regions may be fabricated upon a surface of the waveguide to provide an array of pixels, wherein each pixel is capable of selectively transmitting light out of the waveguide via FTIR. In other words, each MEMs-based region may be selectively switched between active and inactive states, corresponding to ON and OFF states, respectively, of a single pixel. The pixels in an ON state are capable of transmitting light out of the waveguide that can be viewed as an image. The aggregated MEMS-based regions function as a video display capable of color image generation, usually by exploiting field sequential color (e.g., sequentially generating red, green, and blue components of an image) and pulse width modulation techniques. The display systems disclosed in U.S. Pat. No. 5,319,491 and in U.S. Pat. No. 7,092,142, which are herein incorporated by reference in their entirety, are representative of FTIR-based MEMS devices and illustrate the fundamental principles of such devices.

MEMS-based systems, including flat panel displays that exploit the principle of frustrated total internal reflection (FTIR) to induce the emission of light from the system, may need to satisfy certain physical criteria to function properly. For instance, the MEMS devices may have a certain operational voltage level and consume a given power. However, due to the high density of MEMS devices being driven on high resolution display systems in use today, it is desirable to reduce the power consumption of such display systems by any means possible, since excessive power dissipation can turn a competitive display architecture into an untenable design. It would be an improvement in the art to provide an apparatus and method for reducing pixel operational voltage in MEMS-based optical displays.

SUMMARY

Certain aspects commensurate in scope with the disclosure are set forth below. It should be understood that these aspects are presented merely to provide the reader with a brief summary of certain forms the disclosure might take and that these aspects are not intended to limit the scope of the disclosure. Indeed, the disclosure may encompass a variety of aspects that may not be set forth below.

The present invention provides an apparatus and method for reducing the pixel operational voltage in MEMS-based optical displays. In accordance with various embodiments of the present invention, provided is a system that includes a light guide, a first conductor layer, a second conductor layer, and a deformable membrane layer comprising a piezoelectric material having an adjustable effective spring constant, wherein application of an electric field across the deformable membrane layer causes the adjustable effective spring constant to decrease from a first spring constant value to a second spring constant value. In a MEMS-based optical display system, the capability of dynamically reducing the effective spring constant of the deformable membrane layer at each pixel location permits a reduction in the operational voltage required to propel the deformable membrane towards a surface of the light guide to couple TIR light out of the light guide via FTIR.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed in greater detail below, certain embodiments of the present technique are directed to reducing the operational voltage of devices (e.g., MEMS devices) that are used to selectively control the extraction of light from a waveguide. The power consumption of such systems is proportional to the square of the voltage being applied in the system, so reducing the MEMS operational voltage can lead to immediate and substantial reduction in power consumption for any display architecture capable of implementing such voltage reduction features. In some embodiments, an electric field is induced to modify physical properties of at least a portion of a deformable membrane layer within a MEMS device such that the modified physical properties mechanically assist in deflecting the deformable membrane between an active or activated state and an inactive or deactivated state and vice-versa. In certain embodiments, it is believed that such mechanical assistance reduces the voltage level (e.g., the operational voltage) that would otherwise be employed to cause deflection of the deformable membrane layer. Accordingly, in certain embodiments, such a technique enables use of a lower operational voltage to deflect the deformable membrane between active and inactive states (e.g., positions). These and other embodiments of the present technique may be employed in various display systems, including those discussed in more detail below.

Figure 1:
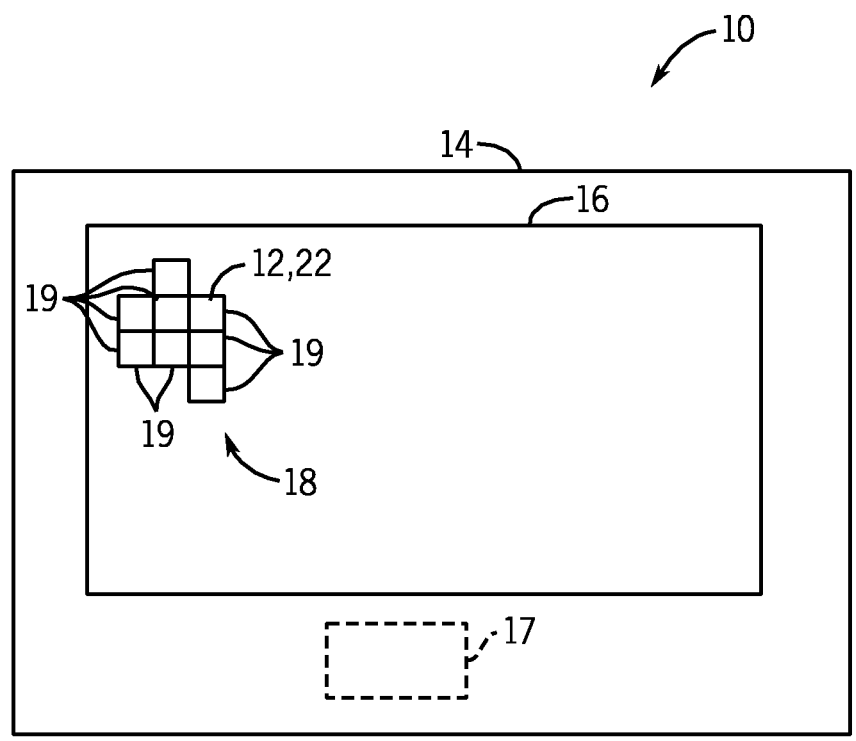
FIG. 1 is a block diagram that illustrates a display system in accordance with certain embodiments of the present technique.

FIG. 1 illustrates a flat panel display system 10 that incorporates a pixel generation device (e.g., a MEMS device) 12 in accordance with one or more embodiments of the present invention. As discussed in detail below, the device 12 may include a variety of embodiments to reduce the operational voltage. As depicted, the display system 10 generally includes a display housing 14, a display screen 16, and a display controller 17.

The display housing 14 generally includes a rigid structure configured to support and protect the display screen 16 and other components. For instance, the display housing 14 may include a plastic, metal, or similar material that provides a shell around components of the display system 10. Accordingly, the display housing 14 may include a cutout region for positioning of the display screen 16 and/or a cavity internal to the computer housing 14 for housing the various electronics, such as the display controller 17, power supplies, and/or similar devices, associated with the operation of the display system 10.

The display controller 17 generally includes circuitry and/or a computer based device capable of controlling various functions of the display system 10. For instance, the controller 17 may include an integrated or external computer device (e.g., a processor) that runs various routines or software to control the operation of the display screen 16, to regulate power within the display system 10, and the like. For example, where the display screen 16 generally includes an array of pixels that are activated and deactivated in coordination, the display controller 17 may provide signals (e.g., control signals) that regulate the operation of each of the pixels and their associated devices to ensure that a displayed image is perceived accurately by a viewer. Further, where the image to be displayed is delivered to the display system via an internal or an external signal (e.g., from a cable provider, an antenna, or an output of a computer), the display controller 17 may also include conversion circuitry to receive and/or interpret the incoming signal and coordinate the operation of the display screen 16 appropriately.

As suggested above, the display screen 16 generally includes a region that projects an image perceivable by a viewer. For example, the display screen 16 may include the portion of a television or computer monitor, or similar display device that directs light toward the viewer. Typically, the display screen 16 includes an array of pixels 18, wherein each pixel 19 of the array of pixels 18 produces (or represents) a discrete portion of the image. Each of the pixels 19 emits light of a given color and intensity, such that when viewed together the combination of light from the array of pixels 18 is perceived as an image. Generally, the array of pixels 18 includes a two-dimensional array (e.g., having a width and height), and the array of pixels 18 is typically operated in coordination to generate one or more two-dimensional images. The light emitted at each pixel 19 location can be generated from a variety of sources.

In flat panel display systems 10, including those disclosed below, the display system 10, and more specifically, the display screen 16, may include a waveguide (or light guide) that includes a display surface that is configured to pass light at various locations (e.g., pixel locations) along the display surface. Each of these locations may represent one of the pixels 19 of the displayed image, and the array of pixels 18 may be located across the display surface of the waveguide to enable generation of the one or more images. The principle of operation for any of the plurality of pixels 19 distributed across the waveguide involves locally, selectively, and controllably frustrating the total internal reflection of light bound within the waveguide. For example, in TMOS flat panel display systems the TIR light may be frustrated by propelling a deformable membrane layer comprising an optically-suitable material into contact or near-contact with the display surface of the waveguide. In some display systems, this may include disposing the deformable membrane layer proximate the display surface of the waveguide such that a microscopic gap exists between the deformable membrane layer and the display surface of the waveguide. An active pixel 19 generally includes the optically-suitable deformable membrane layer disposed in contact or in near-contact with the display surface of the waveguide such that internally reflected light (i.e., TIR light) is frustrated at the location of the pixel 19 and light is capable of being directed out of the waveguide at the location of the pixel 19. In contrast, an inactive pixel 19 generally includes the deformable membrane layer sufficiently displaced from (e.g., not in contact or in near-contact with) the slab waveguide, such that evanescent coupling across the gap is negligible, and light is not directed out of the display surface of the waveguide, but is instead internally reflected into the waveguide at the location of the inactive pixel 19 pursuant to the principle of total internal reflection (TIR).

Figure 2A:
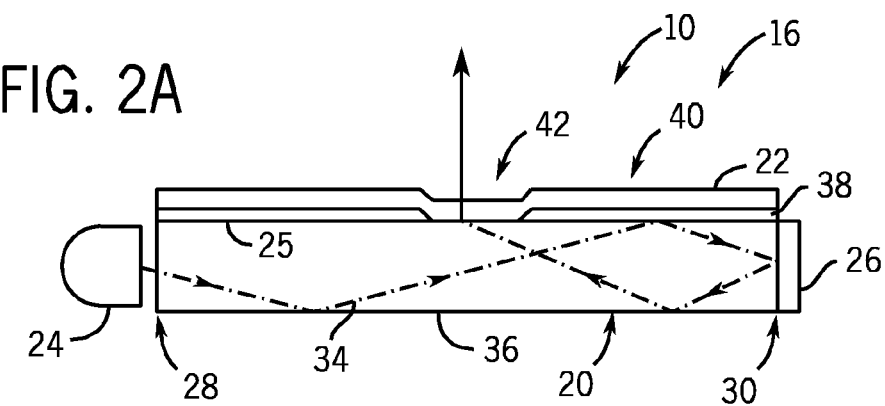
FIG. 2A is a side view of a display system employing a waveguide in accordance with certain embodiments of the present technique.
Figure 2B:
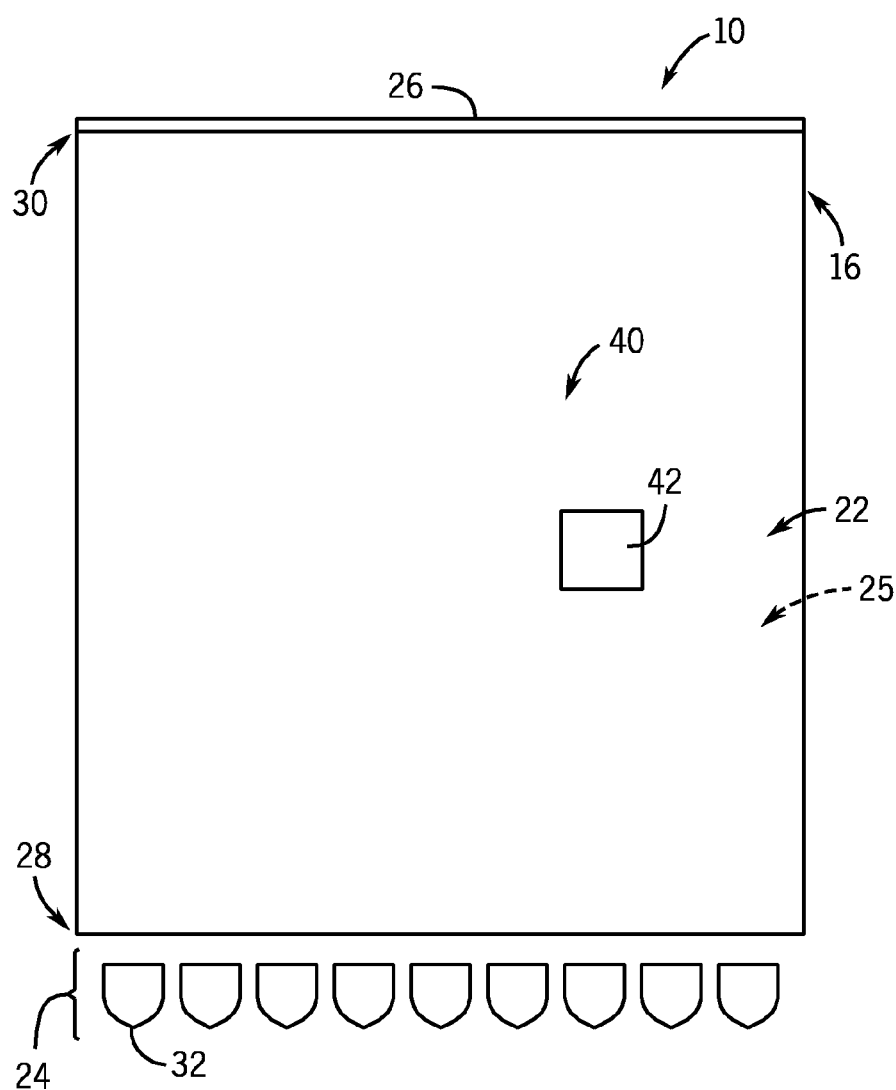
FIG. 2B is a top view of the display system of FIG. 2A in accordance with certain embodiments of the present technique.

FIGS. 2A and 2B illustrate embodiments of the flat panel display system 10 and the display screen 16 that may be employed with various pixel actuation or activation techniques, such as those discussed with regard to FIG. 1 as well as the embodiments disclosed below. In the illustrated embodiment, the flat panel display system 10 includes a waveguide (e.g., a light guide) 20, a deformable membrane layer 22 comprising an optically-suitable material, a light source 24, and a reflective element 26. The deformable membrane layer 22 is disposed proximate a display (top) surface 25 of the waveguide 20, the light source 24 is disposed proximate an injection edge 28 of the waveguide 20, and the reflective element 26 is disposed proximate a reflective edge 30 that is opposite the injection edge 28. The light source 24 may be air-coupled to the injection edge 28 of the waveguide 20. As illustrated, the light source 24 may include one or more constituent light sources 32. In operation, light is emitted from the light source 24, injected into the waveguide 20 at the injection edge 28, and subsequently internally reflected as TIR light within the waveguide 20 as illustrated by a light path 34. For example, in the illustrated embodiment, the light path 34 reflects off of a bottom surface 36 of the waveguide 20, the top surface 25 of the waveguide 20, and the reflective element 26.

As depicted in FIG. 2A, TIR light following the light path 34 may be reflected by or passed through the top surface 25 of the waveguide 20. For example, manipulating a boundary condition of refractive indices (e.g., mechanical arrangement of refractive indices) at portions of the top surface 25, may cause TIR light to either reflect back into the waveguide 20 or exit the waveguide 20 via FTIR. In other words, by mechanical rearrangement of the boundary condition at portions of the top surface 25, incident light encounters a sequence of refractive index materials that determines the light's subsequent trajectory. As illustrated, the boundary condition at the top surface 25 can be manipulated by moving the position/state of the deformable membrane layer 22 into contact (or near contact) with the top surface 25 of the waveguide 20. Where a microscopic gap 38 exists between the deformable membrane layer 22 and the top surface 25 of the waveguide 20, the low refractive index of air (i.e., a refractive index lower than the refractive index of the waveguide material) causes the light that strikes the top surface 25 of the waveguide 20 to internally reflect towards the interior of the waveguide 20. This may be referred to as an inactive region, inactive pixel, deactivated pixel, pixel in the off-state and the like, and is generally indicated by reference numeral 40. However, where the microscopic gap 38 is reduced and/or eliminated and the deformable membrane layer 22 is near or in contact with the top surface 25, the index of refraction of the membrane layer 22, which is equal to or greater than the refractive index of the waveguide 20, is perceived by light waves in the near-field vicinity of the top surface 25, thereby causing the light to be directed out of waveguide 20 due to frustration of total internal reflection combined with evanescent coupling phenomena associated with sufficiently small gaps between the higher refractive index materials in the stack sequence. This dynamically-imposed layer sequence may be referred to as an active region, active pixel, pixel in the on-state and the like, and is generally indicated by reference numeral 42. In other words, the deformable membrane layer 22 may be selectively brought into contact or near contact (e.g., very close proximity) to the top surface 25 of the waveguide 20 to frustrate the total internal reflection at or near the active region 42, thereby locally directing light out of the waveguide 20. As illustrated in the depicted embodiment, where light following the light path 34 strikes the inactive region 40 (e.g., a deactivated pixel) the light is reflected into the interior of the waveguide 20. However, where the light path 34 strikes the active region 42 (e.g., an activated pixel) the light is directed out of the waveguide 20. To construct an image, a plurality of active and inactive regions 42 and 40, respectively, are generally employed simultaneously and in coordination (e.g., individually and selectively controlled) to generate a perceivable image from the pixel array 18 and the display system 10.

The deformable membrane layer 22 is generally disposed over the top surface 25 of the waveguide 20 and may include a configuration and material that is conducive to controllably directing light out of the waveguide 20. For example, the deformable membrane layer 22 can include a contiguous thin film sheet of polymeric material with a refractive index selected to optimize the coupling of light out of the waveguide 20 during the contact/near-contact events that can occur at very high speeds. This may permit the generation of adequate gray scale levels for multiple primary colors at each pixel 19 in accordance with video frame rates and help to avoid excessive motional and color breakup artifacts in the image, thereby helping to preserve smooth image and video generation.

Propulsion of the deformable membrane layer 22 can be achieved by the electromechanical and/or ponderomotive deformation of a contiguous thin polymeric sheet that forms at least a portion of the deformable membrane layer 22. In certain embodiments, the propulsion of the deformable membrane layer 22 is provided via a micro-electro-mechanical system (MEMS), as briefly discussed above. In such an embodiment, each pixel 19 of the display system 10 may be controlled by one or more MEMS devices. For example, in one embodiment, each pixel includes a MEMS device that applies an appropriate electrical potential (e.g., electric field) across the gap 38 between conductors associated with the slab waveguide 20 and the deformable membrane layer 22 to actuate the pixel. The electrical potential provides an electric field across the gap 38 that causes high-speed motion of the deformable membrane layer 22 by elastically deforming or stretching the membrane layer 22 toward the waveguide 20. Removal of the electric field causes the deformable membrane to be mechanically restored by elastically retracting to its original undeflected state (i.e., the off-state of the pixel). Actuation to the activated state may be deemed completed when the deformable membrane layer 22 can move no closer to the slab waveguide 20. Movement of the deformable membrane layer 22 may be limited by the inability of the deformable membrane layer 22 to elastically deform any further and/or may be limited due to physical contact with the slab waveguide 20. Generating the electric field may include imposing an operational voltage having a high enough potential to generate a sufficient Coulomb attraction to deflect the deformable membrane layer 22 toward the display surface 25 of the waveguide 20. The embodiments discussed in detail below provide various methods of deflecting the deformable membrane layer 22 and potentially reducing the operational voltage to do so.

Figure 3A:
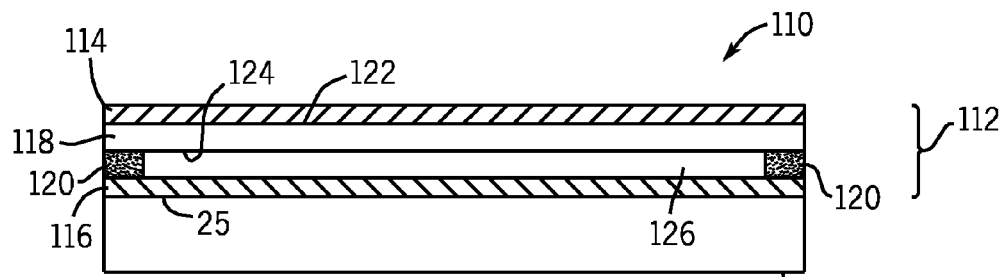
FIGS. 3A-3C illustrate a MEMS device of the display system in accordance with certain embodiments of the present technique.
Figure 3B:
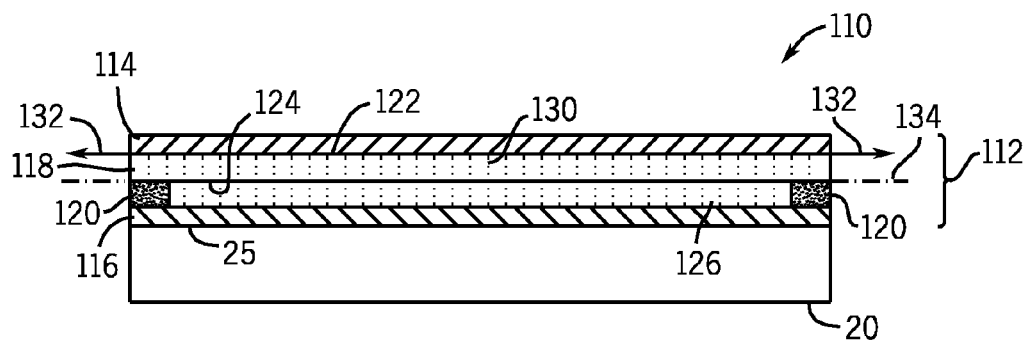
Figure 3C:
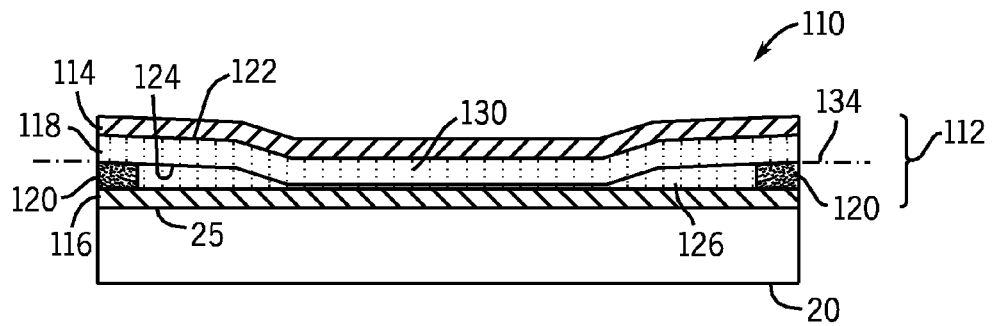

Turning now to FIGS. 3A-3C, illustrated is one embodiment of a MEMS 110 in accordance with the present technique. Such a MEMS 110 may be employed at each of the pixels 19 of the display system 10, in certain embodiments. FIG. 3A illustrates the MEMS 110 in a deactivated state (i.e., quiescent state or off-state of the pixel). FIG. 3B illustrates the MEMS 110 in a transitional state, wherein the pixel 19 is transitioning from the deactivated state to an activated state. FIG. 3C illustrates the MEMS 110 in an activated state (i.e., on-state of the pixel).

The MEMS 110 includes a MEMS device 112 and the waveguide 20. The MEMS device 112 includes a first conductor 114, a second conductor 116, a deformable membrane layer 118, and standoffs 120. The deformable membrane layer 118 includes a top surface 122 that faces the direction of light ejection toward the viewer, and a bottom surface 124 that faces the display surface 25 of the waveguide 20.

In one embodiment, at least a portion of the deformable membrane layer 118 is disposed between the first conductor 114 and the second conductor 116 such that an electric field generated between the first conductor 114 and the second conductor 116 may act on the portion of the deformable membrane layer 118 positioned between them. As is discussed in detail below, the electric field may cause expansion and/or elastic deflection of the portion of the deformable membrane layer 118 and other portions of the MEMS device 112 (e.g., the conductor 114) that may be disposed on or within the deformable membrane layer 118. In the illustrated embodiment, the first conductor 114 is disposed on the top surface 122 of the deformable membrane layer 118, and the second conductor 116 is disposed on the display surface 25 of the waveguide 20. This illustrated embodiment does not have a conductor disposed on the bottom surface 124 of the deformable membrane layer 118. Although not depicted in this or some of the embodiments to follow, optionally, a dielectric layer may be deposited over a top surface of the second conductor 116 and/or the top surface of the waveguide 20 in this and the following embodiments. A gap 126 exists between the bottom surface 124 of the deformable membrane layer 118 and the second conductor 116. The gap 126 may be attributable to the spacing provided by the standoffs 120 that are positioned between the bottom surface 124 of the deformable membrane layer 118 and the second conductor 116.

In certain embodiments, an electric field between conductors (e.g., the first conductor 114 and the second conductor 116) may generate a sufficient force (e.g., a force via Coulomb attraction) to deflect at least the deformable membrane layer 118 toward and away from the waveguide 20 (e.g., to deflect the deformable membrane 118 between the activated state and the deactivated state). However, in some embodiments, a supplemental force may be used to provide a portion or all of the force needed to deflect the deformable membrane layer 118 between the activated state and/or the deactivated state. To decrease the force or potential required to deflect the deformable membrane layer 118 toward the waveguide 20 during pixel actuation, the deformable membrane layer 118 comprises a material having properties that are conducive to (i.e., capable of indirectly facilitating) the deflecting/deformation of the polymeric deformable membrane layer 118 between the activated state and the deactivated state when an electric field is applied thereto. In particular, the polymeric deformable membrane layer 118 comprises a piezoelectric material having a transverse piezoelectric property. When an electric field is applied through the deformable membrane layer 118 at a pixel location 19, the deformable membrane layer 118 elastically expands laterally (e.g., in a direction within a plane extending through the deformable membrane layer 118 in the unactuated state and generally parallel to the display surface 25 of the waveguide 20). The lateral expansion of the deformable membrane layer lengthens the membrane at the pixel location 19 and, consequently, effectively reduces the effective spring constant (e.g., Young's Modulus) of the membrane layer 118. Removal of the electric field extinguishes the transverse piezoelectric effect and consequently the deformable membrane layer 118 elastically retracts to its original size and shape in the deactivated state. This transverse piezoelectric property of the polymeric deformable membrane layer 118 may be exploited by selectively applying an electric field to the deformable membrane layer 118 in order to modify (e.g., decrease and increase) the effective spring constant of the deformable membrane layer 118. In turn, this dynamically adjustable effective spring constant of the deformable membrane layer 118 can be reduced to decrease the magnitude of the electrical potential difference needed between the first conductor 114 and the second conductor 116 to cause the deformable membrane 118 to move (e.g., deflect) into contact (or near contact) with the waveguide 20 and/or the second conductor 116, such that the TIR condition at the display surface 25 of the waveguide 20 is violated and light is released to the viewer during actuation of the pixel (pixel is turned on). It is noted that because the released light passes through the deformable membrane layer 118, in some embodiments, the deformable membrane layer 118 is transparent or at least semi-transparent or translucent.

As depicted in FIG. 3A, in the deactivated state the deformable membrane layer 118 is slightly pre-tensioned such that the membrane layer 118 is generally parallel to the top surface 25 of the waveguide 20, in one embodiment. Pre-tensioning may include stretching the deformable membrane layer 118 such that it is generally taut. For example, the deformable membrane layer 118 may be stretched between and affixed to the standoffs 120 in some embodiments, or may include a layer of material that is stretched across the area of the display and resting on the standoffs 120 in another embodiment. As depicted in FIG. 3B, when the pixel is transitioning to an activated state, an electric field (shown as dotted vertical lines) 130 passing through the deformable membrane layer 118 causes the deformable membrane layer 118 to expand laterally, in the direction of arrows 132, along a plane 134 that runs through the deformable membrane layer 118 and is generally parallel to the display surface 25 of the waveguide 20. The lateral expansion reduces the tension in the deformable membrane layer 118 and, thus, may reduce the effective force to deform and propel the deformable membrane layer 118 across the gap 126 to make contact (or near contact) with the display surface 25 of the waveguide 20 and/or the second conductor 16 to frustrate the TIR of the waveguide 20. Accordingly, where an operational voltage (e.g., an electric potential across a plurality of conductors) is used to propel the deformable membrane layer 118 between the activated and deactivated states, applying the electric field across the deformable membrane layer 118 may induce expansion of the deformable membrane layer 118 and reduce the operational voltage level required during the transitional state to actuate (e.g., deflect) the pixel between the deactivated and activated states. As a result, effectively reducing the spring constant of the deformable membrane layer 118 and, thus, the required pixel operational voltage, enables a reduction in the power consumed in providing the requisite potential across the conductors (e.g., the first and second conductors 114 and 116) to deflect the deformable membrane layer 118 from the deactivated state (e.g., FIG. 3A) to the activated state (e.g., FIG. 3C).

When the pixel is deactivated (turned off) the electric field 130 is reduced or eliminated and the deformable membrane layer 118 may retract from the activated state, effectively increasing the spring constant of the deformable membrane layer 118. In one embodiment, when the electric field 130 is eliminated or reduced to a near zero magnitude, the lateral expansion of the deformable membrane layer 118 is elastically reversed and the original tension of the deformable membrane in its deactivated state is restored. The increase in tension of the deformable membrane layer 118 provides a restoring force that biases and moves the deformable membrane layer 118 from the activated state (e.g., deflected state) to the deactivated (e.g., undeflected state). Such a restoring force aides in overcoming any forces (e.g., stiction forces) that resist mechanically restoring the deformable membrane layer 118 back to the deactivated position. For example, the restoring force may aid in fully detaching the deformable membrane layer 118 from the waveguide 20 such that it returns to the deactivated state by way of local shear forces thereby generated at the boundary between the deformable membrane and the light guide during contact in the activated state. Accordingly, where an operational voltage (e.g., an electric potential across a plurality of conductors) is used to propel the deformable membrane layer 118 between the activated and deactivated states, removing the electric field 130 increases the mechanical restorative force available to return the pixel from the activated state to the deactivated state because the deformable membrane 118 may laterally contract in proportion to the transverse piezoelectric constant(s) of the piezoelectric material, thereby enhancing the native restoring force that draws the deformable membrane layer 118 from the activated state to the deactivated state. Thus, in the embodiments of FIGS. 3A-3C a low actuation (operational) voltage and high restorative force can sequentially co-exist because the effective spring constant of the deformable membrane layer 118 is no longer a constant, but is, instead, varied dynamically by exploiting the transverse piezoelectric property of the deformable membrane layer 118.

Figure 4A:
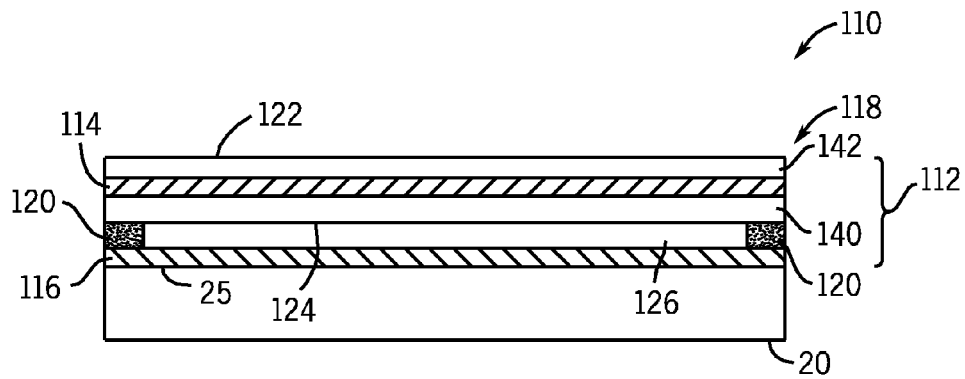
FIGS. 4A-4C illustrate the MEMS device of the display system in accordance with certain embodiments of the present technique.
Figure 4B:
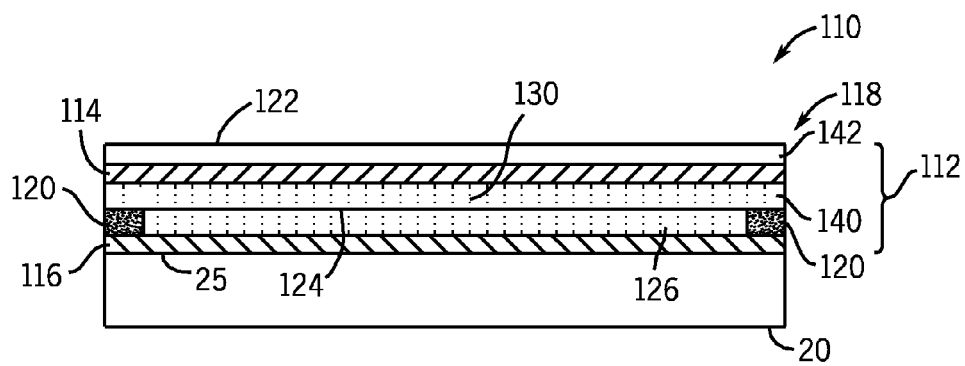
Figure 4C:
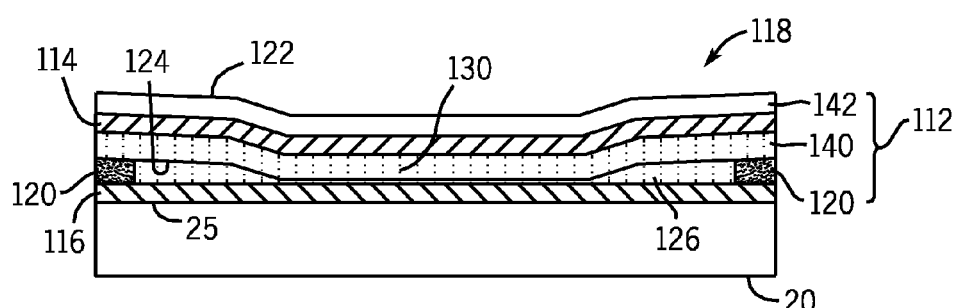

FIGS. 4A-4C illustrate another embodiment of the MEMS 110 in accordance with the present technique. FIG. 4A illustrates the MEMS 110 in a deactivated state (i.e., quiescent state or off-state of the pixel). FIG. 4B illustrates the MEMS 110 in a transitional state (i.e., a transition from the deactivated state to the activated state). FIG. 4C illustrates the MEMS 110 in an activated state (i.e., on-state of the pixel).

The MEMS 110 includes a MEMS device 112 and the waveguide 20, similar to the embodiments disclosed above. However, the MEMS device 112 includes the first conductor 114 embedded within the deformable membrane layer 118 such that there is material of the deformable membrane layer 118 disposed above and below the first conductor 114, thereby forming a multi-layer (e.g., a bi-layer) structure. In other words, the first conductor 114 is embedded within the deformable membrane layer 118 such that a first portion 140 of the deformable membrane layer 118 is disposed on a side of the first conductor 114 that faces the waveguide 20 and a second portion 142 of the deformable membrane layer 118 is disposed on a side of the first conductor 114 that is opposite from the first portion 140 (e.g., on the side of the conductor opposite the waveguide 20 and in the direction of the expulsion of light to the viewer). In the illustrated embodiment, the first portion 140 and the second portion 142 are completely separated from one another by the first conductor 114. However, in some embodiments, these two portions 140 and 142 may include one or more points of continuity between one another (e.g., interconnects between the two portions 140, 142 through and/or around the first conductor 114).

Similar to the previously discussed embodiment, the embodiments of FIGS. 4A-4C take advantage of the deformable membrane layer 118 comprising one or more piezoelectric materials (e.g., polymers) that exhibit a suitably high transverse piezoelectric property. In such an embodiment, when a pixel associated with the MEMS 110 is activated, and the electric field 130 is generated between the first conductor 114 and the second conductor 116, the electric field (shown as dotted vertical lines) 130 only passes through the first portion 140 of the deformable membrane layer 118 causing the first portion 140 to expand laterally, due to the transverse piezoelectric effect, and, thereby, reducing the effective spring constant of the first portion 140 of the deformable membrane layer 118. However, the second portion 142 of the deformable membrane layer 118 is not exposed to the electric field 130 and does not expand laterally. Although the second portion 142 of the deformable membrane 118 may exhibit some lateral expansion via coupling (e.g., mechanical coupling) to the first conductor 114 and/or to the first portion 140, the second portion 142 is not directly exposed to the electric field 130 and the resulting transverse piezoelectric effect and, thus, the second portion 142 remains in a generally unaltered (e.g., unstretched or unexpanded) state. Because the first portion 140 and the second portion 142 may be coupled to one another (e.g., laminated together), a difference in the in-plane stresses between these portions 140 and 142 may arise, thereby causing the deformable membrane layer 118 to deform and deflect or flex in the direction of the first portion 140 and towards the waveguide 20 and/or the second conductor 116, as depicted in FIG. 4C. Thus, when the pixel is activated, the Coulomb attraction (e.g., force) caused by the operational voltage applied across the conductors 114 and 116 is supplemented by the stress differential in the deformable membrane layer 118 to propel the deformable membrane layer 118 into contact (or near contact) with the waveguide 20 and/or the second conductor 116. In other words, both the effective reduction in the tension (e.g., the spring constant) of the first portion 140 of the deformable membrane layer 118 and the difference in stress between the first portion 140 and second portion 142 of the deformable membrane layer 118 reduces the operational voltage required to propel the deformable membrane layer 118 across the gap 126 to make contact (or near contact) with the waveguide 20 and/or the second conductor 116, and to frustrate the TIR of the waveguide 20 at the pixel location 19. Similar to the previous discussion with regard to FIGS. 3A-3C, when a pixel associated with the MEMS 110 is deactivated by removing the electric field, the lateral expansion of the first portion 140 of the deformable membrane layer 118 elastically reverses and retracts, effectively increasing the spring constant of the deformable membrane layer 118 and enhancing the native restoring force that moves the deformable membrane layer 118 from the activated state to the deactivated state. Thus, in the embodiments of FIGS. 4A-4C a low actuation (e.g., operational) voltage and high restorative force can sequentially co-exist because the effective spring constant of the deformable membrane layer 118 is no longer a constant, but is varied dynamically by exploiting the transverse piezoelectric property of the deformable membrane layer 118.

Figure 5A:
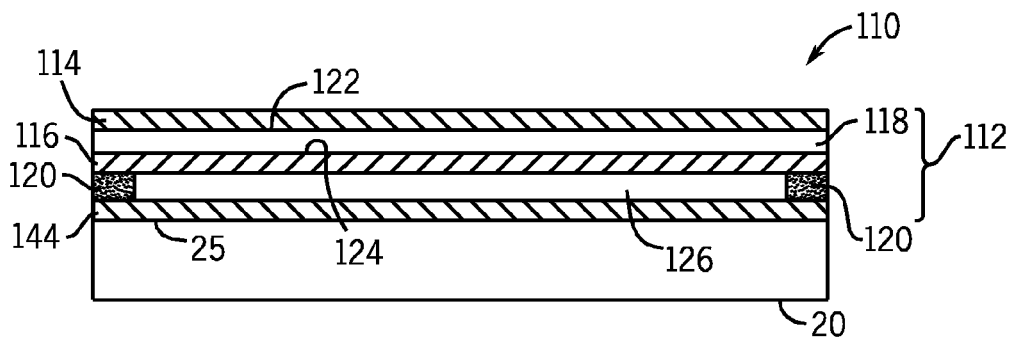
FIGS. 5A-5C illustrate the MEMS device of the display system in accordance with certain embodiments of the present technique.
Figure 5B:
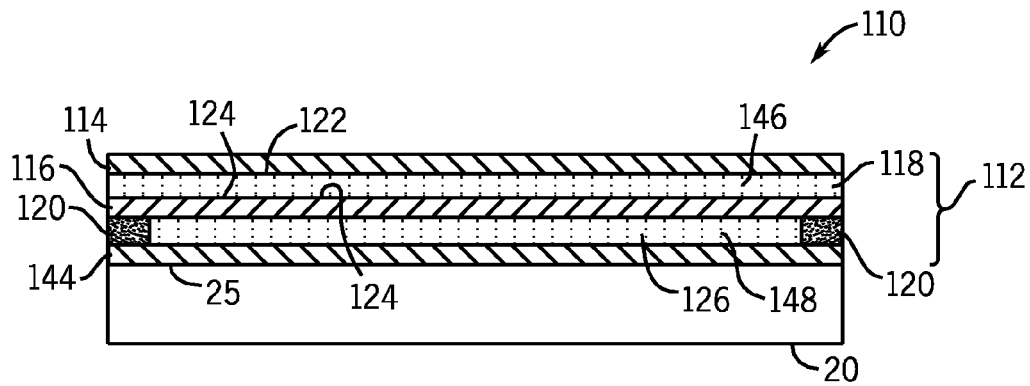
Figure 5C:
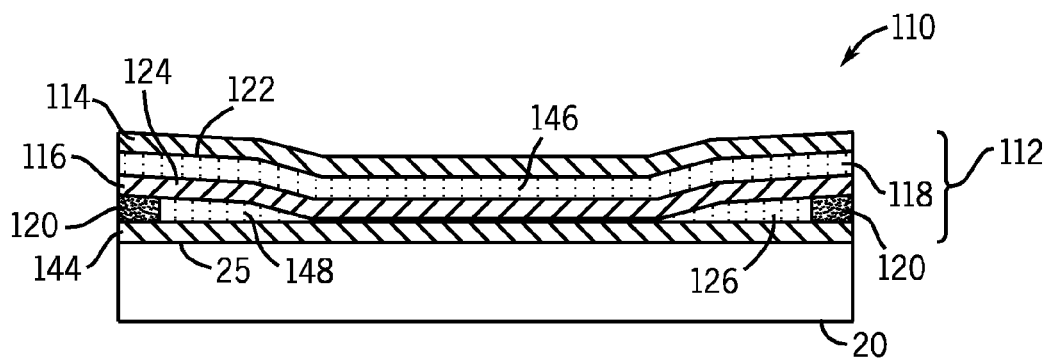

FIGS. 5A-5C, illustrate another embodiment of the MEMS 110 in accordance with the present technique. FIG. 5A illustrates the MEMS 110 in a deactivated state (i.e., quiescent state or off-state of the pixel). FIG. 5B illustrates the MEMS 110 in a transitional state, wherein the pixel 19 is transitioning from the deactivated state to the activated state). FIG. 5C illustrates the MEMS 110 in an activated state (i.e., on-state of the pixel).

The MEMS 110 includes a MEMS device 112 and the waveguide 20. The MEMS device 112 includes the first conductor 114, the second conductor 116, a third conductor 144, the deformable membrane layer 118, and the standoffs 120. In one embodiment, at least a portion of the deformable membrane layer 118 is disposed between the first conductor 114 and the second conductor 116 such that an electric field generated between the first conductor 114 and the second conductor 116 may act on the portion of the deformable membrane layer 118 positioned between them. In the illustrated embodiment, the first conductor 114 is disposed on the top surface 122 of the deformable membrane layer 118, and the second conductor 116 is disposed on the bottom surface 124 of the deformable membrane layer 118. The third conductor 144 is disposed proximate (e.g., on) the display surface 25 of the waveguide 20. The gap 126 exists between the second conductor 116 and the third conductor 144.

In the illustrated embodiment, the presence of three conductors 114, 116 and 144, enables the isolation of a plurality of electrical fields between the respective conductors. For example a first electric field 146 is generated between the first conductor 114 and the second conductor 116, and a second electric field 148 is generated between the second conductor 116 and the third conductor 144, in one embodiment. Each of the first and second electric fields 146 and 148 can be isolated from one another and generated independently from one another, in some embodiments.

In one embodiment, the first conductor 114 and the second conductor 116 are charged to generate the first electric field 146 across the deformable membrane layer 118. The second conductor 116 and the third conductor 144 can be charged concurrently to generate the second electric field 148 across the gap 126 between the deformable membrane 118 and the waveguide 20. Similar to previous discussions, the first electric field 146 may cause lateral expansion of the deformable membrane layer 118 and, thereby, lower the effective spring constant of the deformable membrane layer 118. Once again, the lateral expansion of the deformable membrane layer 118 reduces the tension within the deformable membrane layer 118 and, thus, reduces the force needed to propel it across the gap 126. This reduces the operational voltage and strength of the second electric field 148 in the gap 126 needed to actuate the pixel 19 associated with the MEMS across conductors 114 and 116. Concurrently generating the second electrical field 148 provides a force, due to the Coulomb attraction between second conductor 116 and the third conductor 144, to actuate the pixel by propelling the deformable membrane layer 118 into contact (or near contact) with the waveguide 20. Accordingly, the first electric field 146 may reduce the effective spring constant of the deformable membrane layer 118 and the second electric field 148 may provide a force to urge deflection of the deformable membrane layer 118 from the deactivated position to the activated position. The intimate contact of conductors 114 and 116 on the respective surfaces of the deformable membrane layer 118 provide the most efficient imposition of the applied electric field to maximize the transverse piezoelectric effect that leads to dynamic reduction of the effective spring constant, in contrast to the previously disclosed embodiments that have only two conductors that do not exhibit this level of intimacy between conductors and deformable membrane involved in this behavior.

Similar to the previous discussions with regard to FIGS. 3A-4C, when the pixel associated with the MEMS 110 is deactivated, the first and second electric fields 146 and 148 are reduced and/or eliminated and the deformable membrane layer 118 retracts, effectively increasing the spring constant of the deformable membrane layer 118, and, thereby, enhancing the native restoring force that moves the deformable membrane layer 118 from the activated state to the deactivated state. Accordingly, where an operational voltage (e.g., an electric potential across a plurality of conductors) is used to propel the deformable membrane layer 118 between the activated and deactivated states, removing the first electric field 146 may reduce the operational voltage to actuate the pixel from the activated state to the deactivated state because the deformable membrane 118 may contract, thereby providing a restoring force that draws the deformable membrane layer 118 from the activated state to the deactivated state. Thus, in the embodiments of FIGS. 5A-5C, a low actuation (operational) voltage and high restorative force can co-exist because the effective spring constant of the deformable membrane layer 118 is no longer a constant, but can be varied dynamically by exploiting the transverse piezoelectric property of the deformable membrane layer 118. Further, in some embodiments, the second electric field 148 may be employed during the transition from the activated to the deactivated states to assist (e.g., increase the native restoring force) that urges the deformable membrane layer toward the deactivated state. For example, the second conductor 116 and the third conductor 144 may be charged such that they repel one another.

Figure 6A:
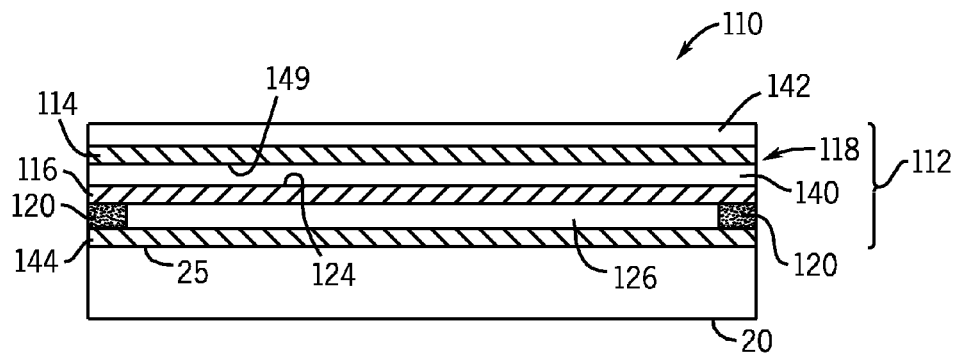
FIGS. 6A-6C illustrate the MEMS device of the flat panel display system in accordance with certain embodiments of the present technique.
Figure 6B:
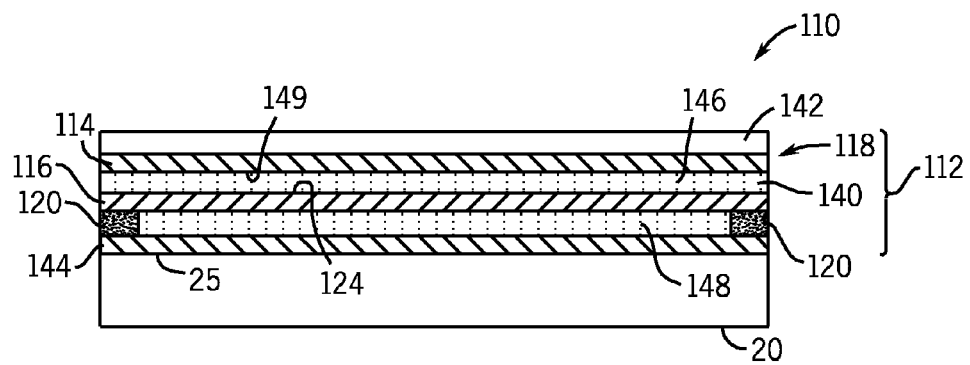
Figure 6C:
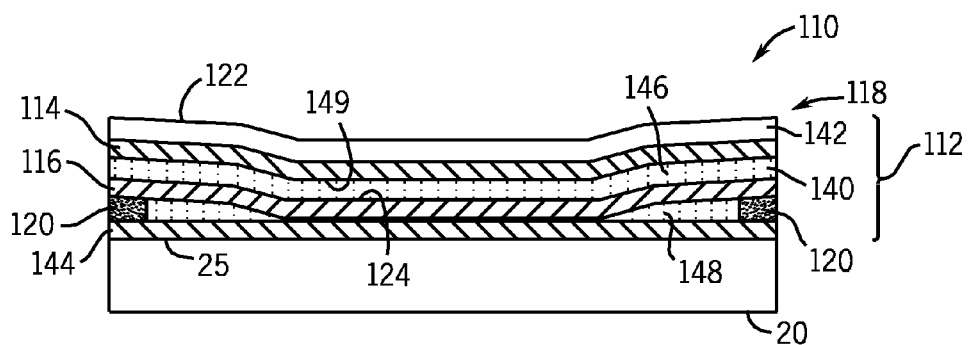

FIGS. 6A-6C illustrate another embodiment of the MEMS 110 in accordance with the present technique. FIG. 6A illustrates the MEMS 110 in a deactivated state (i.e., quiescent state or off-state of the pixel). FIG. 6B illustrates the MEMS 110 in a transitional state, wherein the pixel 19 is transitioning from the deactivated state to the activated state. FIG. 6C illustrates the MEMS 110 in an activated state (i.e., on-state of the pixel).

Once again, the MEMS 110 includes a MEMS device 112 and the waveguide 20. The MEMS device 112 includes the first conductor 114, the second conductor 116, the third conductor 144, the deformable membrane layer 118, and the standoffs 120. Similar to the embodiment discussed with regard to FIGS. 4A-4C, the first conductor 114 is embedded within the deformable membrane layer 118 such that there are portions of the deformable membrane layer 118 above and below the first conductor 114, thereby forming a multi-layer (e.g., bi-layer) structure. In other words, the first conductor 114 is embedded within the deformable membrane layer 118 such that the first portion 140 of the deformable membrane layer 118 is disposed on the side of the first conductor 114 that faces the waveguide 20 and the second portion 142 of the deformable membrane layer 118 is disposed on a side of the first conductor 114 that is opposite from the side where the second portion 142 is disposed (e.g., on the side of the conductor opposite the waveguide 20 and in the direction of the expulsion of light). In the illustrated embodiment, the first portion 140 and the second portion 142 are completely separated from one another by the first conductor 114. However, in some embodiments, these two portions 140 and 142 may include one or more points of continuity between one another (e.g., interconnects between the two portions 140, 142 through and/or around the first conductor 114).

Similar to the embodiments discussed with regard to FIGS. 5A-5C, in the illustrated embodiment, the first portion 140 of the deformable membrane layer 118 is disposed between the first conductor 114 and the second conductor 116 such that an electric field generated between the first conductor 114 and the second conductor 116 may act on the first portion 140 of the deformable membrane layer 118 positioned between them. In the illustrated embodiment, the first conductor 114 is disposed on a top surface 149 of the first portion 140 of the deformable membrane layer 118 (e.g., a surface between the two portions 140 and 142 of the deformable membrane layer 118), and the second conductor 116 is disposed on the bottom surface 124 of the deformable membrane layer 118. The third conductor 144 is disposed proximate to (e.g., on) the display surface 25 of the waveguide 20, and the gap 126 exists between the second conductor 116 and the third conductor 144.

In the illustrated embodiment, the presence of three conductors 114, 116 and 144, enables the isolation of electrical fields between the respective conductors. For example the first electric field 146 is generated between the first conductor 114 and the second conductor 116, and the second electric field 148 is generated between the second conductor 116 and the third conductor 144, in one embodiment. Accordingly, each of the first and second electric fields 146 and 148 can be isolated from one another and generated independently from one another, in some embodiments.

In one embodiment, the first conductor 114 and the second conductor 116 can be charged to generate the first electric field 146 across the first portion 140 of the deformable membrane layer 118. The second conductor 116 and the third conductor 144 can be charged concurrently to generate the second electric field 148 between the deformable membrane 118 and the waveguide 20. Once again, the first electric field 146 may cause lateral expansion of the deformable membrane layer 118 and thereby lower the effective spring constant of the deformable membrane layer 118. Similar to the previous discussions, the lateral expansion of the deformable membrane layer 118 reduces its tension and thus reduces the force needed to propel it across the gap 126. This reduces the voltage needed to actuate the MEMS 110 at the associated pixel location. Concurrently generating the second electrical field 148 provides a force, due to the Coulomb attraction between second conductor 116 and the third conductor 144, to actuate the pixel by propelling the deformable membrane layer 118 into contact (or near contact) with the waveguide 20. Accordingly, the first electric field 146 may reduce the effective spring constant of the deformable membrane layer 118 and the second electric field 148 may provide a force to urge deflection of the deformable membrane layer 118 from the deactivated position to the activated position.

Further, when the MEMS 110 and the associated pixel is activated, and the first electric field 146 is generated between the first conductor 114 and the second conductor 116, the electric field (shown as dotted vertical lines) 146 only passes through the first portion 140 of the deformable membrane layer 118. However, the second portion 142 of the deformable membrane layer 118 is not exposed to the electric field 146 and, thus, does not expand laterally. Although the second portion 142 of the deformable membrane layer 118 may exhibit some lateral expansion via coupling (e.g., mechanical coupling) to the first conductor 114 and/or to the first portion 140, the second portion 142 is not directly exposed to the first electric field 146 and, thus, the second portion 142 remains in a generally unaltered state. Because the first portion 140 and the second portion 142 may be coupled to one another (e.g., laminated together), a difference in the in-plane stresses between these portions 140 and 142 may arise, thereby causing the deformable membrane layer 118 to deform and deflect or flex toward the first portion 140 and towards the waveguide 20 and/or the second conductor 116, as depicted in FIG. 6C. Thus, when the MEMS 110 and the associated pixel is activated, the Coulomb attraction caused by the second electric field 148 is supplemented by the stress differential in the deformable membrane layer 118 to propel the deformable membrane layer 118 into contact (or near contact) with the waveguide 20 and/or the second conductor 116. Once again, this reduces the operational voltage needed to actuate the MEMS 110 and the associated pixel.

Similar to the previous discussions, when the MEMS 110 and the associated pixel are deactivated, the first and second electric fields 146 and 148 are reduced and/or eliminated, and the deformable membrane layer 118 retracts, effectively increasing the spring constant of the deformable membrane layer 118 and thereby providing a stronger restoring force that moves the deformable membrane layer 118 from the activated state to the deactivated state. Thus, in the embodiments of FIGS. 6A-6C a low actuation (i.e., operational) voltage and high restorative force can sequentially co-exist because the effective spring constant of the deformable membrane layer 118 is no longer a constant, but can be varied dynamically by exploiting the transverse piezoelectric property of the deformable membrane layer 118.

In each of the previously discussed embodiments, the MEMS device 112 includes a conductive layer (e.g., the second conductive layer 116 of FIGS. 3A-3C and 4A-4C or the third conductive layer 144 of FIGS. 5A-5C and 6A-6C) disposed proximate to or coupled to the display surface 25 of the waveguide 20. In each of the embodiments, the conductive layer disposed proximate to the display surface 25 is used in coordination with at least one other conductive layer to generate an electric field that induces a Coulomb attraction between the conductors associated with the deformable membrane layer(s) and the light guide. However, in other embodiments, a conductive layer may not be disposed proximate to and/or coupled to the display surface 25 of the waveguide 20. In such an embodiment, the Coulomb attraction may be reduced and/or absent, and the force to deflect the deformable membrane layer 118 between the deactivated state and the activated state may be provided by some other mechanism. In other words, the deflection between states is not supplemented by the Coulomb attraction. In some embodiments, the deflection may be caused solely by the lateral expansion of the deformable membrane layer 118. For example, in some embodiments, the deflection of the deformable membrane layer 118 is urged in the direction of the waveguide 20 via the configuration of the structure of the MEMS device 112. In another embodiment, the deflection is urged in the direction of the light guide by an external device or mechanism that may or may not be part of the MEMS device 112.

Figure 7A:
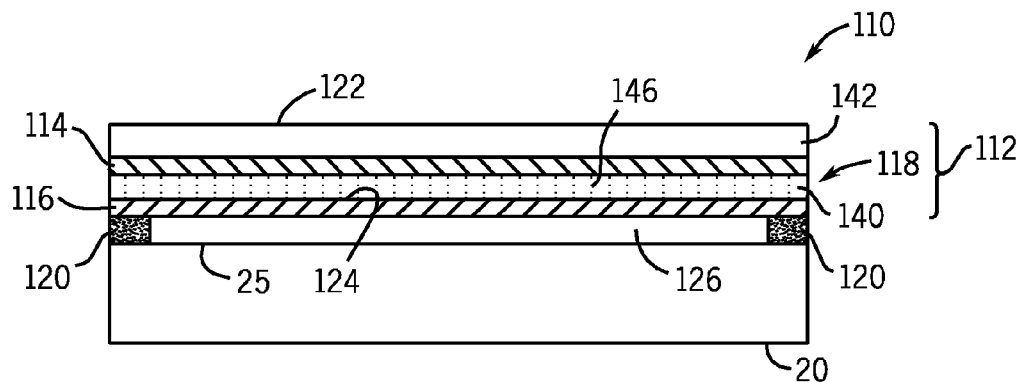
FIG. 7A illustrates the MEMS device of the flat panel display system not having a conductor disposed on the waveguide, in accordance with certain embodiments of the present technique.

FIG. 7A illustrates one embodiment of the MEMS 110 in accordance with the present technique. In the illustrated MEMS 110, the MEMS device 112 includes a configuration similar to that of FIGS. 6A-6C, but does not include a conductor layer (e.g., the conductive layer 144) coupled to and/or proximate the waveguide 20. Accordingly, the deflection of the deformable membrane layer 118 is caused by the first electric field 146 generated across a portion of the deformable membrane layer 140. In operation, similar to the MEMS of FIG. 6A-6C, to activate the MEMS device 112 and the associated pixel, the first conductor 114 and the second conductor 116 can be charged to generate the first electric field 146 across the deformable membrane layer 118, in one embodiment. The first electric field 146 causes lateral expansion of the first portion 140 of the deformable membrane layer 118 and thereby lowers the effective spring constant of the deformable membrane layer 118. Similar to the previous discussions, the lateral expansion of the deformable membrane layer 118 reduces its in-plane tension and, further, may provide the force needed to propel it across the gap 126 to make contact or near contact with the display surface 25 of the waveguide 20. Although the second portion 142 of the deformable membrane 118 may exhibit some lateral expansion via coupling (e.g., mechanical coupling) to the first conductor 114 and/or to the first portion 140, the second portion 142 is not directly exposed to the first electric field 146 and, thus, the second portion 142 remains in a generally unaltered state. The differences in the in-plane stresses between these portions 140 and 142 may arise, thereby causing the deformable membrane layer 118 to deform and deflect or flex towards the waveguide 20. Thus, when the associated pixel is turned on, no supplemental force is needed to propel the deformable membrane layer 118 towards and into contact or near contact with the waveguide 20. Instead, the deflection of the deformable membrane layer 118 is provided without the addition of a second electric field (e.g., the second electric field 148 shown in FIGS. 5 and 6) that generates a Coulomb attraction. Once again, this reduces the operational voltage needed to actuate the MEMS 110 and the associated pixel. Similar to the previous discussions, when the MEMS 110 and the associated pixel is deactivated, by reducing or eliminating the first electric field 146, the concomitant increase in the effective spring constant enhances the native elastic restoring force that causes the deformable membrane layer 118 to retract and move from the activated state to the deactivated state. Other embodiments may include similar configurations that rely on the deformation and/or lateral expansion to provide for the deflection of the deformable membrane layer 118 between the deactivated and activated states. For example, in an embodiment similar to that of FIG. 5A-5C, the third conductor 144 may be removed or not employed, and the deflection of the deformable membrane layer 118 may be provided via lateral expansion and contraction of the deformable membrane layer 118 without additional contributions, such as those of the Coulomb effect created by another electric field.

Figure 7B:
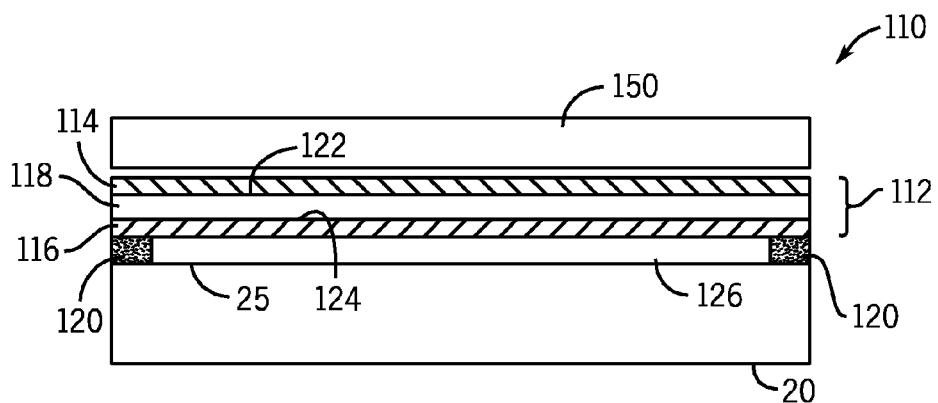
FIG. 7B illustrates the MEMS device of the flat panel display system having a cover slip, in accordance with certain embodiments of the present technique.
Figure 7C:
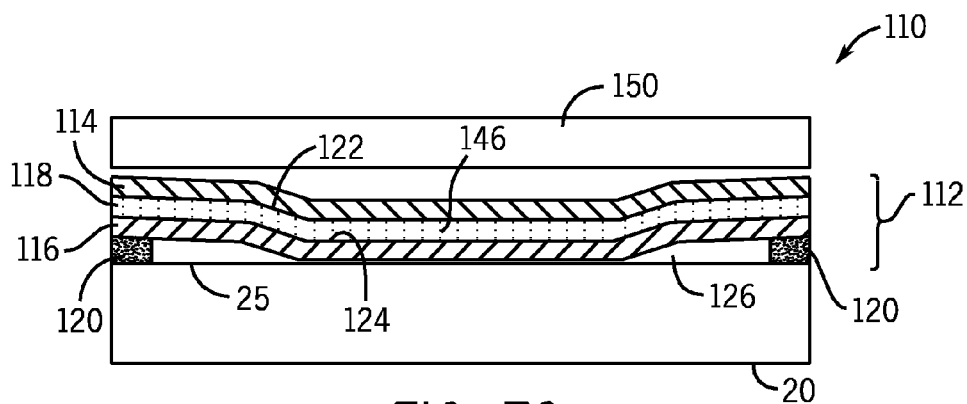
FIG. 7C illustrates the MEMS device of the flat panel display system having a cover slip, in accordance with certain embodiments of the present technique.

FIGS. 7B and 7C illustrate another embodiment of the MEMS 110 in accordance with the present technique. In the deactivated state illustrated in FIG. 7B, the MEMS 110 includes a cover slip 150 disposed over the top surface of the MEMS device 112 which has a similar configuration to that discussed with regard to FIGS. 5A-5C but without the third conductor 144. The presence of the cover slip 150 positioned above the MEMS device 112 ensures that during the transitional state, the lateral expansion of the deformable membrane layer 118 results in a deflection of the deformable membrane layer 118, and any associated conductors, towards the waveguide 20 rather than away from the waveguide 20. In other words, where lateral expansion of the deformable membrane layer 118 occurs and there is not a supplemental force, the cover slip 150 blocks deflection of the deformable membrane layer 118 away from the waveguide 20, and urges the deformable membrane layer 118 to deflect and move toward the waveguide 20, as depicted in the activated state shown in FIG. 7C. Accordingly, the cover slip 150 may block the deformable membrane layer from deflecting away from the waveguide 20 when there is no Coulomb attraction toward the waveguide, or when the Coulomb attraction toward the waveguide 20 and/or minimal deflection in a portion (e.g., the second portion 142) of the deformable membrane layer 118 is not sufficient to ensure deflection toward the waveguide 20. In one embodiment, the cover slip 150 includes a polymer, glass, or similar material that can resist deflection of the MEMS device 112. Further, because the released light generally passes through the cover slip 150, the cover slip 150 preferably comprises a transparent material, in some embodiments. Although such an embodiment is discussed with regard to a system similar to that of FIGS. 5A-5C, other embodiments may include the cover slip 150 in conjunction with any embodiment of the MEMS 110 discussed herein.

Figure 8A:
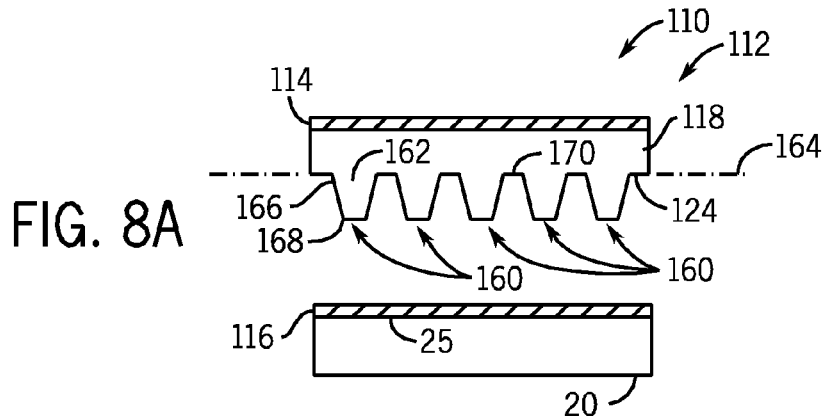
FIG. 8A-8D illustrate the MEMS device of the flat panel display system having optical microstructures in accordance with certain embodiments of the present technique.

Although not depicted in the previously discussed embodiments, in some embodiments, the deformable membrane layer 118 may include optical microstructures that enhance light extraction and control of the extracted light. FIG. 8A illustrates a pixel in a deactivated state where the lower surface 124 of the deformable membrane layer 118 includes a plurality of optical microstructures 160. In the illustrated embodiment, the microstructures 160 include protrusions 162 that extend toward the waveguide 20 from a plane 164 that extends through the bottom surface 124 of the deformable membrane layer 118. The protrusions 162 include side surfaces 166 and bottom surfaces (e.g., light apertures) 168. The bottom surfaces 168 are generally parallel to the display surface 25 of the waveguide 20. The side surfaces 166 extend between the bottom surface 124 of the deformable membrane layer 118 and the bottom surfaces 168 of the microstructures 160. In one embodiment, the microstructures 160 are arranged in an array or pattern that forms valleys (e.g., indentations) 170 between each of the protrusions 162.

Similar to other embodiments of the MEMS 110, in the deactivated state, the deformable membrane layer 118 and the microstructures 160 do not contact the waveguide 20, and the light waves are totally internally reflected within the waveguide 20. In the activated state, the deformable membrane layer 118 is deflected into contact (or near contact) with the waveguide 20 and the light apertures 168 of the optical microstructures 160 contact (or nearly contact) the top surface 25 of the waveguide 20 to couple light out of the waveguide 20 (via FTIR) and direct the light toward the viewer.

In the illustrated embodiment, the first conductor 114 is positioned proximate the top surface 122 of the deformable membrane layer 118, the second conductor 116 is positioned proximate the waveguide 20 in a configuration similar to that of FIGS. 3A-3C. However, such a microstructure 160 can be used in conjunction with any of the MEMS 110 disclosed herein. For example, one embodiment may include a similar configuration of the microstructures 160 used in conjunction with an embedded conductor, such as those discussed with regard to FIGS. 4A-4C. In another embodiment, no conductor may be positioned proximate the waveguide 20, as discussed with regard to FIGS. 7A-7C, and the second conductor 116 may be embedded between the microstructures 160 and the deformable membrane layer 118.

Figure 8B:
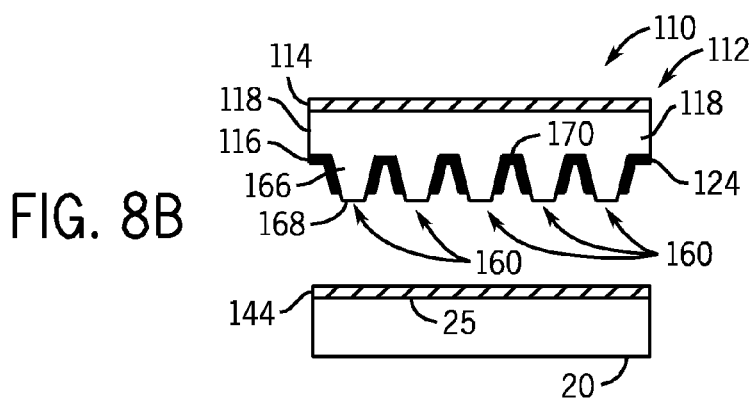
Figure 8C:
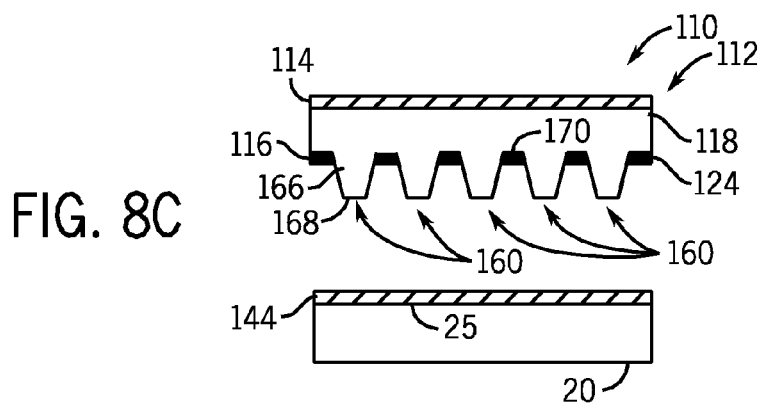

FIG. 8B illustrates another embodiment of the MEMS 110 including the microstructures 160 in accordance with the present technique. In the illustrated embodiment, the second conductor 116 is disposed about the microstructures 160. More specifically, the second conductor 116 includes a layer of conductive material disposed about a portion of the side surfaces 166 of the microstructures 160, and within the valleys 170 between each of the microstructures 160. Preferably the second conductor 116 is opaque.

Similar to other embodiments of the MEMS 110, in the deactivated state, the deformable membrane layer 118, the microstructures 160, and the second conductor 116 are separated from the display surface 25 of the waveguide 20 by a gap. In the activated state, the deformable membrane layer 118 is deflected into contact (or near contact) with the waveguide 20 such that the light apertures 168 come into contact (or near contact) with the display surface 25 to couple light out of the waveguide 20 via FTIR and direct the light to the viewer. An electric field between the second conductor 116 and the third conductor 144, provides Coulomb attraction that causes deflection and movement of the deformable membrane layer 118 towards the waveguide 20.

In the illustrated embodiment, the first conductor 114 is positioned proximate the top surface 122 of the deformable membrane layer 118, the second conductor 116 is positioned proximate the bottom surface 124 of the deformable membrane layer 188, in a configuration similar to that of FIGS. 5A-5C. However, such a microstructure 160 can be used in conjunction with any of the MEMS 110 disclosed herein. For example, one embodiment may include a similar configuration of the microstructures 160 used in conjunction with an embedded conductor, such as those discussed with regard to FIGS. 6A-6C. In another embodiment, no conductor may be positioned proximate the waveguide 20, as discussed with regard to FIGS. 7A-7C FIG. 8C illustrates another embodiment of the MEMS 110 including the microstructures 160 in accordance with the present technique. In the illustrated embodiment, the second conductor 116 is disposed about the microstructures 160. More specifically, the second conductor 116 includes a layer of conductive material disposed within the interstitial areas or valleys 170 between each of the microstructures 160. In this embodiment the second conductor abuts a portion of the side surfaces 166, however does not extend along the side surfaces 166 of the microstructures 160 as previously depicted in FIG. 8B. Again, preferably second conductor 116 is opaque.

Similar to other embodiments of the MEMS 110, in the deactivated state, the deformable membrane layer 118 and the microstructures 160 do not contact the waveguide 20. In the activated state, the deformable membrane layer 118, comprising a piezoelectric material, is deflected into contact or near contact via techniques such as those disclosed herein, and the light aperture 168 of the optical microstructure 160 contacts (or nearly contacts) the waveguide 20 to couple light out of the waveguide 20 (via FTIR) and direct the light out of the viewer. Accordingly, light may pass through the aperture 168 of each microstructure 160. In one embodiment, it may be desirable that light passes primarily through or solely through the light aperture 168, and that an insignificant amount of light or no light passes through the valleys 170 and/or the second conductor 116. Accordingly, in one embodiment, the deformable membrane layer 118 and the microstructures 160 are transparent, and the second conductor 116 is opaque.

In the illustrated embodiment, the first conductor 114 is positioned proximate the top surface 122 of the deformable membrane layer 118, the second conductor 116 is positioned proximate the waveguide 20, in a configuration similar to that of FIGS. 5A-5C. However, such a microstructure 160 can be used in conjunction with any of the MEMS 110 disclosed herein. For example, one embodiment may include a similar configuration of the microstructures 160 used in conjunction with an embedded conductor, such as those discussed with regard to FIGS. 6A-6C. In another embodiment, no conductor may be positioned proximate the waveguide 20, as discussed with regard to FIGS. 7A-7C.

Figure 8D:
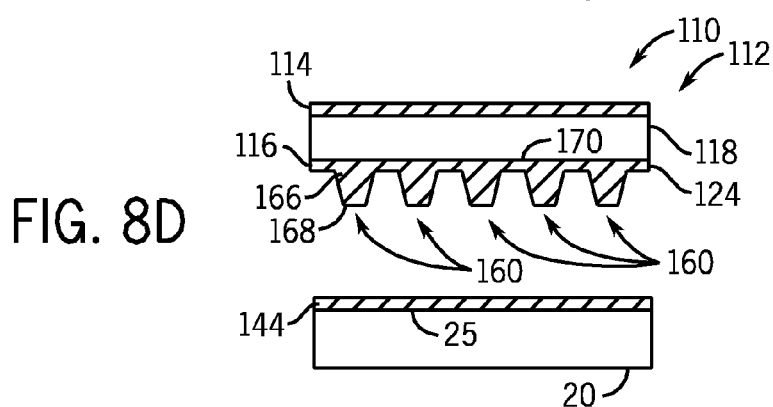

FIG. 8D illustrates another embodiment of the MEMS 110 including the microstructures 160 in accordance with the present technique. In the illustrated embodiment, the microstructures 160 are formed within the second conductor 116. More specifically, the second conductor 116 includes a layer of conductive material disposed along the bottom surface 124 of the deformable membrane layer 118 and including microstructures 160. Alternatively the microstructures 160 may comprise a conductive material. In this embodiment the second conductor 116 is preferably transparent. Also, preferably, a dielectric layer may be disposed over the third conductor 144, in order to prevent shorting between the second and third conductors 116 and 144, respectively.

Similar to other embodiments of the MEMS 110, in the deactivated state, the deformable membrane layer 118 and the second conductor 116 (including the microstructures 160) do not contact the waveguide 20. In the activated state, the deformable membrane layer 118 is deflected via a technique, such as those disclosed herein, such that the light apertures 168 of the optical microstructures 160 contact (or nearly contact) the top surface 25 of the waveguide 20 to couple light out of the waveguide 20 (via FTIR) and direct the light to the viewer. Accordingly, light may pass through the portion of the second conductor 116 that forms the microstructure 160. In one embodiment, at least the portion of the second conductor 116 that is proximate to the aperture 168 of the microstructure 160 and in the path of the passing light is transparent. In other embodiments, a substantial portion or the entire second conductor 116 is opaque, as previously mentioned.

In the illustrated embodiment, the first conductor 114 is positioned proximate the top surface 122 of the deformable membrane layer 118, the second conductor 116 is positioned proximate the bottom surface 124 of the deformable membrane layer 188, in a configuration similar to that of FIGS. 5A-5C. However, such a microstructure 160 can be used in conjunction with any of the MEMS 110 disclosed herein. For example, one embodiment may include a similar configuration of the microstructures 160 used in conjunction with an embedded conductor, such as those discussed with regard to FIGS. 6A-6C. In another embodiment, no conductor may be positioned proximate the waveguide 20, as discussed with regard to FIGS. 7A-7C.

Figure 9A:
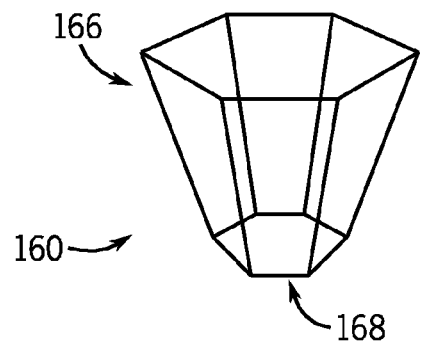
FIG. 9A-9C illustrate geometries of the optical microstructures in accordance with certain embodiments of the present technique.
Figure 9B:
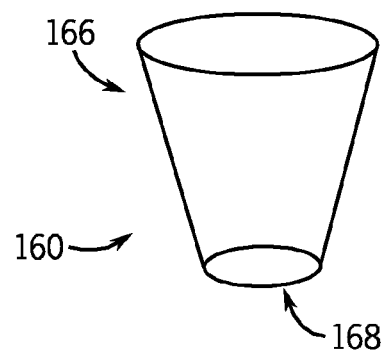
Figure 9C:
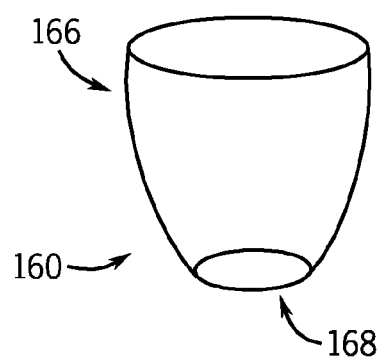

FIGS. 9A-9C illustrate various embodiments of the optical microstructures 160 in accordance with the present technique. The optical microstructures 160 can have any desired geometry, such as pyramidal frustum, conical frustum, and compound parabolic, compound elliptical, polyobject or any conic section revolved to form a solid. FIG. 9A illustrates one embodiment of the optical microstructure 160 having a pyramidal frustum geometry. The pyramidal frustum geometry includes the side surface 166 comprising a plurality of generally flat surfaces (e.g., six flat surfaces) adjacent one another and around the circumference of the optical microstructure 160 and the bottom surface 168 comprising a polygon (e.g., a hexagon) geometry. FIG. 9B illustrates another embodiment of the optical microstructure 160 having a conical frustum geometry, wherein the side surface 166 includes a straight line revolved about an axis at an acute angle. FIG. 9C illustrates yet another embodiment of the optical microstructure 160 having a compound parabolic frustum geometry, wherein the side surface 166 includes a curved line revolved about an axis in a convex manner. The configuration of the optical microstructures may include any desirable shape, arrangement, or the like that is suitable for directing light from the light guide. The display system disclosed in U.S. Patent Publication 2007/0172171, entitled "Optical Microstructures for Light Extraction and Control," and filed Jan. 24, 2006, which is incorporated by reference in its entirety herein, includes a more detailed description of FTIR-based MEMS devices having optical microstructures 160 on a surface of the deformable membrane layer (i.e., active layer) 118.

Figure 10:
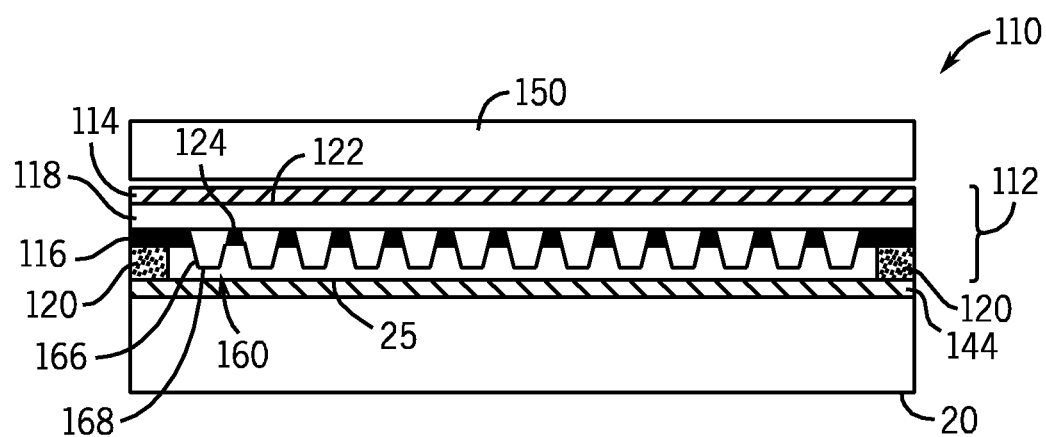
FIG. 10 illustrates the MEMS device of the flat panel display system in accordance with certain embodiments of the present technique.

It may be appreciated that embodiments of the display system 10 may include any combination of the techniques disclosed herein. For example, turning now to FIG. 10 one embodiment of the MEMS 110 is depicted that incorporates a combination of several of the previously discussed techniques. More specifically, the MEMS 110 includes the MEMS device 112, the waveguide 20, and the cover slip 150. The MEMS device 112 includes a configuration similar to that of FIGS. 5A-5C wherein the first conductor 114 and the second conductor 116 are positioned proximate the top and bottom surfaces 122 and 124, respectively, of the deformable membrane layer 118. The MEMS 112 includes the cover slip 150 configured in a similar manner to that discussed with regard to FIGS. 7B and 7C. Further, the MEMS device 112 includes optical microstructures 160 in a configuration similar to those discussed with regard to FIG. 8C. Similarly, other embodiments may include any combination of the techniques disclosed herein.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system comprising:
a light guide;
a first conductor layer;
a second conductor layer;
a deformable membrane layer comprising a piezoelectric material, wherein at least a portion of the deformable membrane layer is positioned between the first conductor layer and the second conductor layer;
the second conductor layer comprising optical microstructures, the second conductor layer being transparent at least proximate to an aperture of each optical microstructure through which light is coupled out of the light guide when the deformable membrane layer is deflected towards the light guide;
and the system further comprising a third conductor layer positioned proximate the light guide, a gap existing between the second conductor layer and the third conductor layer, and the second conductor layer being positioned between the first conductor layer and the third conductor layer;
the system being arranged such that an electrical potential difference applied between the second conductor layer and the third conductor layer causes the deformable membrane layer to deflect towards the light guide.

2. The system of claim 1, wherein the deformable membrane layer has a transverse piezoelectric property.

3. The system of claim 1, wherein the first conductor layer is embedded in the deformable membrane layer such that a first portion of the deformable membrane layer is positioned on a first side of the first conductor layer and a second portion of the deformable membrane layer is positioned on a second side of the first conductor layer and between the first conductor layer and the second conductor layer.

4. The system of claim 1, comprising a slip cover configured to urge the deformable membrane layer to preferentially deflect toward the light guide.

5. The system of claim 1, wherein the deformable membrane layer expands in a direction generally transverse to the direction of an electric field applied between the first conductor layer and the second conductor layer.

6. The system of claim 1, wherein the optical microstructures generally have a pyramidal frustum, a conical frustum or a parabolic frustum geometry.

7. The system of claim 1, wherein the optical microstructures are transparent.

8. The system of claim 1, wherein the entire second conductor layer is transparent.

9. A method comprising:
positioning at least a portion of a deformable membrane layer between a first conductor layer and a second conductor layer, the deformable membrane layer comprising a piezoelectric material, and the second conductor layer comprising optical microstructures, the second conductor layer being transparent at least proximate to an aperture of each optical microstructure through which light is coupled out of the light guide when the deformable membrane layer is deflected towards the light guide;
positioning a third conductor layer proximate the light guide;
providing a gap between the second conductor layer and the third conductor layer; and
applying an electrical potential difference between the second conductor layer and the third conductor layer to cause the deformable membrane layer to deflect towards the light guide.

10. The method of claim 9, wherein the deformable membrane layer has a transverse piezoelectric property.

11. The method of claim 10, wherein the optical microstructures are transparent.

12. The method of claim 10, wherein the entire second conductor is transparent.

13. The method of claim 9, wherein the deformable membrane layer expands in a direction generally transverse to the direction of an electric field applied between the first conductor layer and the second conductor layer.

14. The method of claim 9, further comprising embedding the first conductor layer in the deformable membrane layer such that a first portion of the deformable membrane layer is positioned on a first side of the first conductor layer and a second portion of the deformable membrane layer is positioned on a second side of the first conductor layer and between the first conductor layer and the second conductor layer.

* * * * *

UNITED STATES PATENT AND TRADEMARK OFFICE
CERTIFICATE OF CORRECTION

PATENT NO. : 8,548,289 B2  Page 1 of 1
APPLICATION NO. : 12/808122
DATED : October 1, 2013
INVENTOR(S) : Selbrede et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 657 days.

Signed and Sealed this

Fifteenth Day of September, 2015

Michelle K. Lee
*Director of the United States Patent and Trademark Office*